M. LEHMAN, L. BROWN & E. W. SOHLBERG.
RACING AMUSEMENT APPARATUS.
APPLICATION FILED SEPT. 24, 1906.
912,005.
Patented Feb. 9, 1909.
7 SHEETS—SHEET 1.
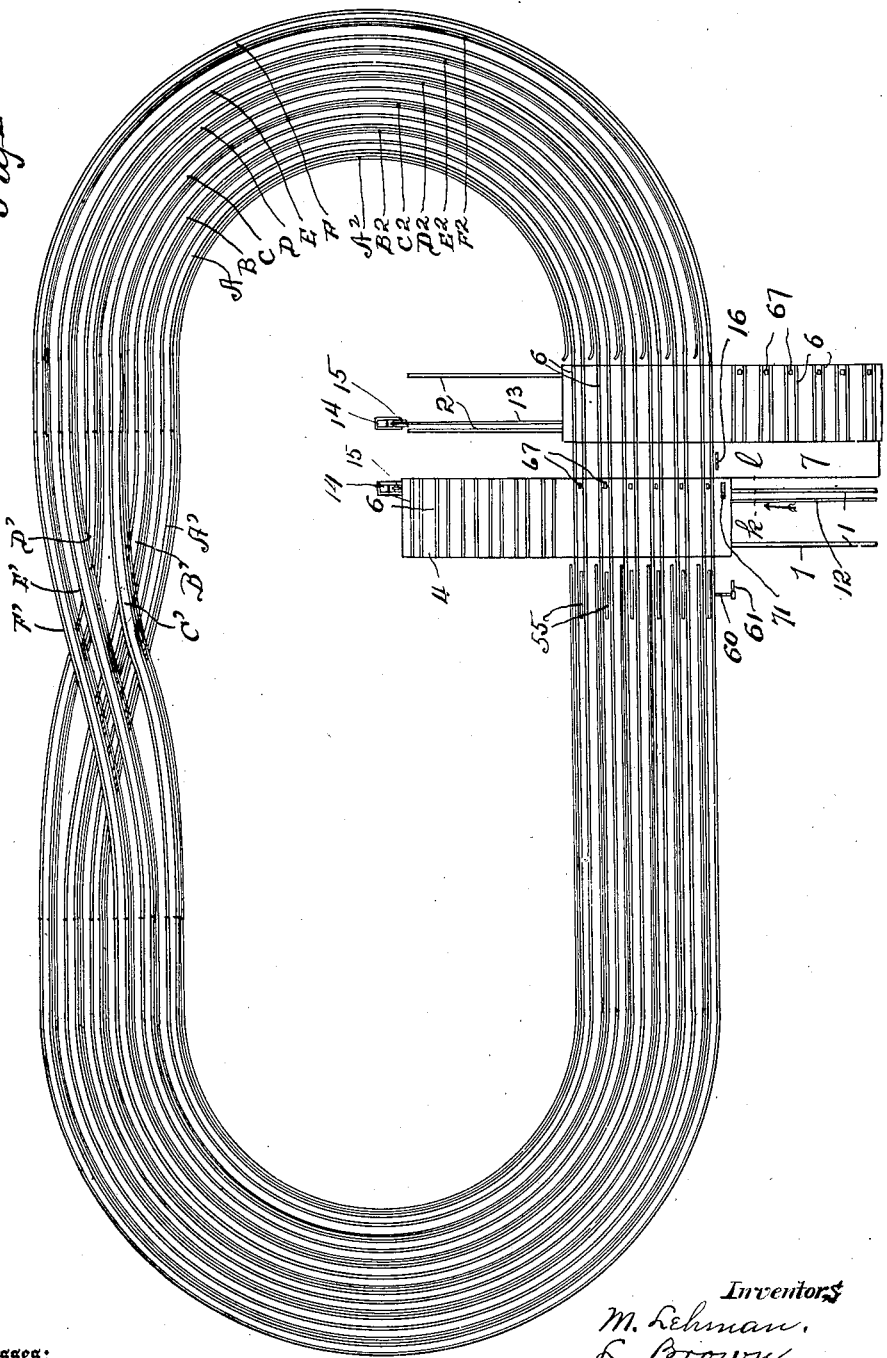

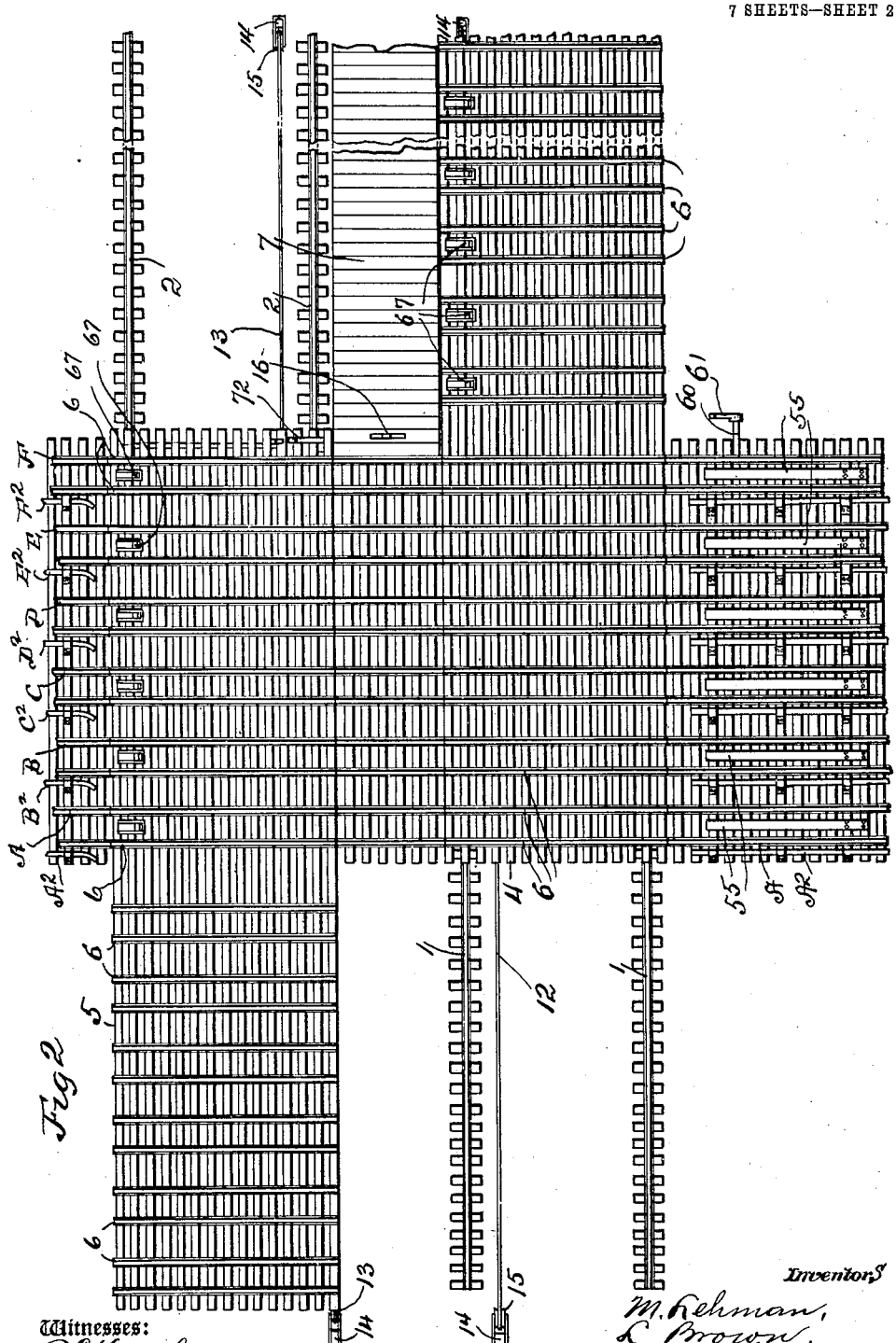

M. LEHMAN, L. BROWN & E. W. SOHLBERG.
RACING AMUSEMENT APPARATUS.
APPLICATION FILED SEPT. 24, 1906.
912,005.
Patented Feb. 9, 1909.
7 SHEETS—SHEET 3.
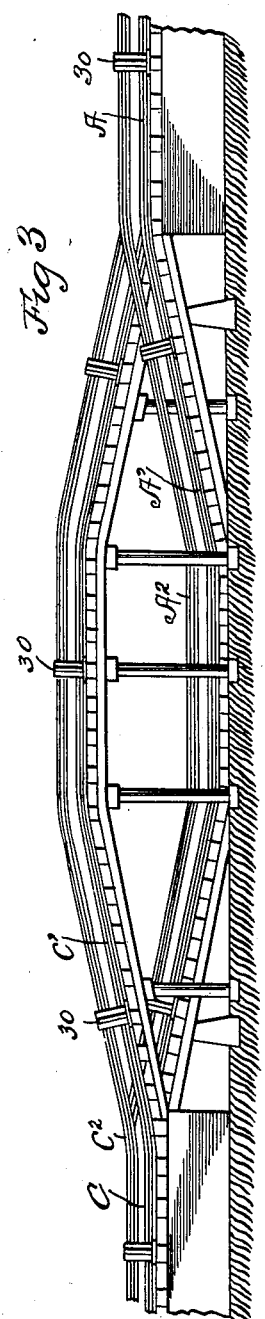
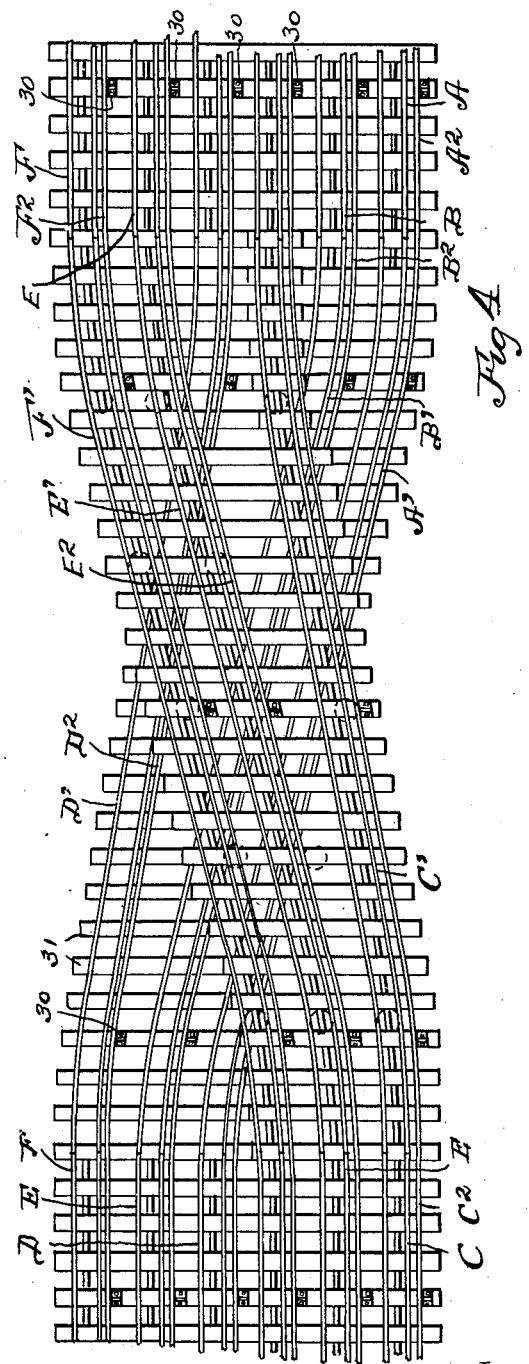

M. LEHMAN, L. BROWN & E. W. SOHLBERG.
RACING AMUSEMENT APPARATUS.
APPLICATION FILED SEPT. 24, 1906.
912,005.
Patented Feb. 9, 1909.
7 SHEETS—SHEET 4.
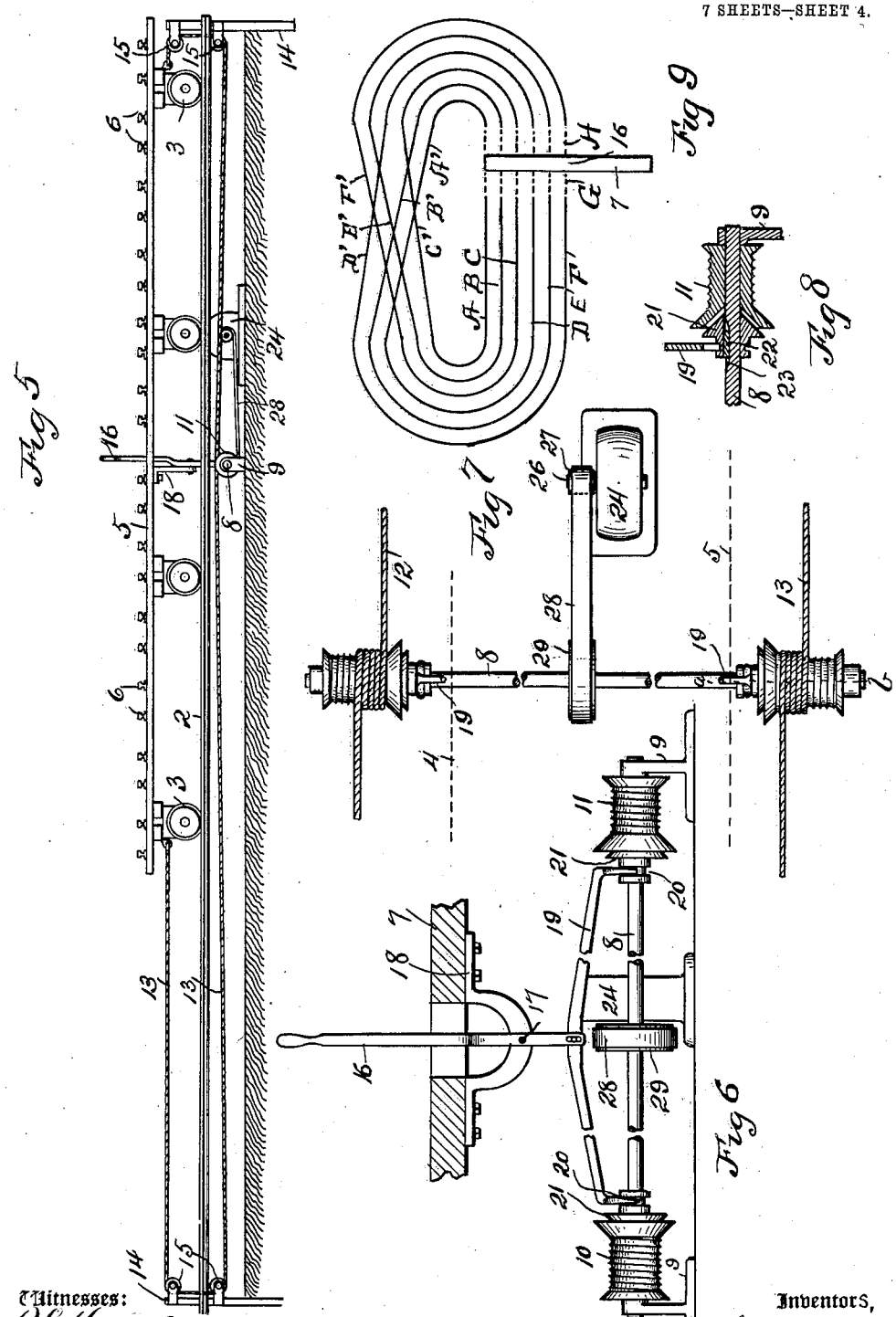

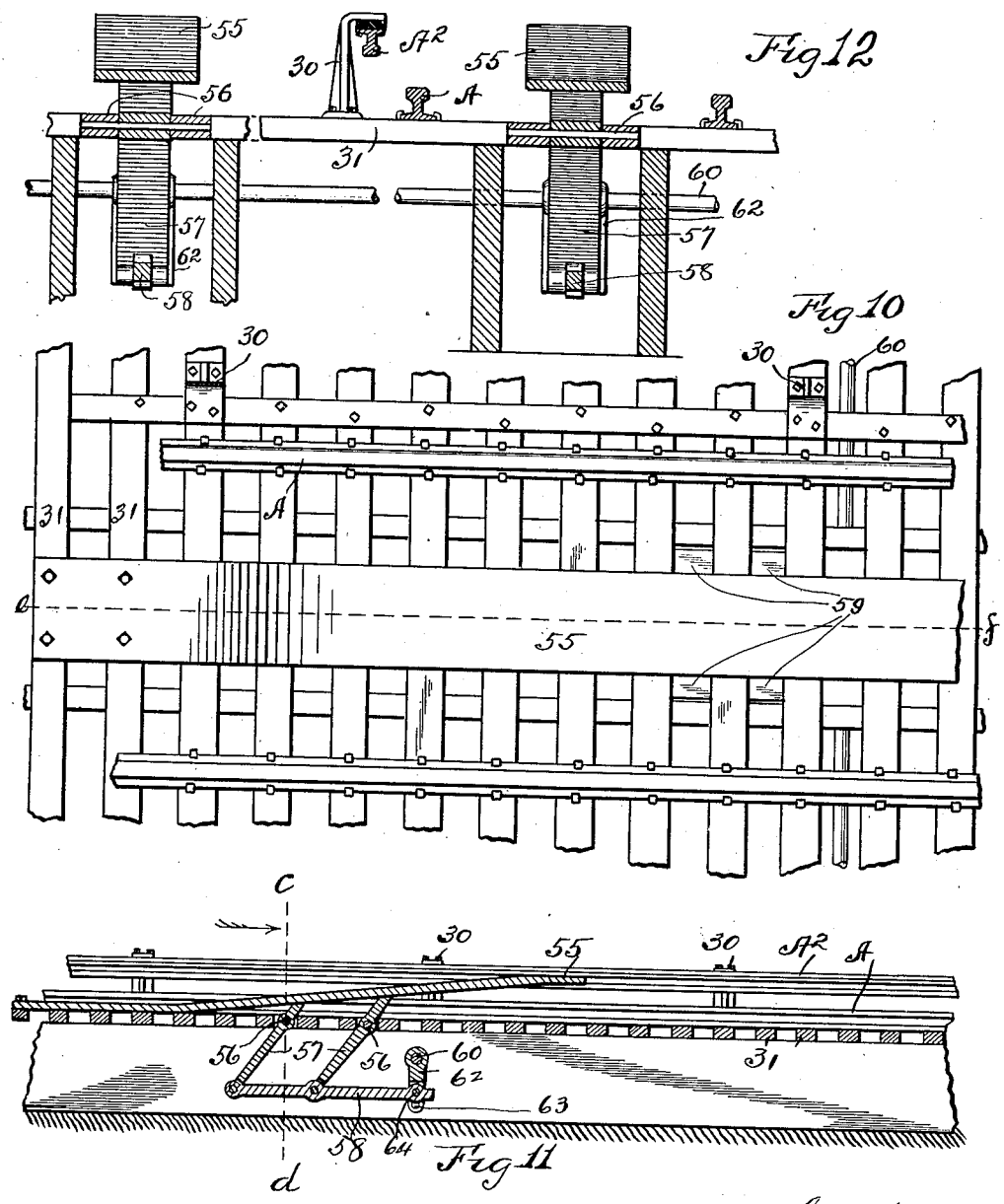

M. LEHMAN, L. BROWN & E. W. SOHLBERG.
RACING AMUSEMENT APPARATUS.
APPLICATION FILED SEPT. 24, 1906.
912,005.
Patented Feb. 9, 1909.
7 SHEETS—SHEET 6.
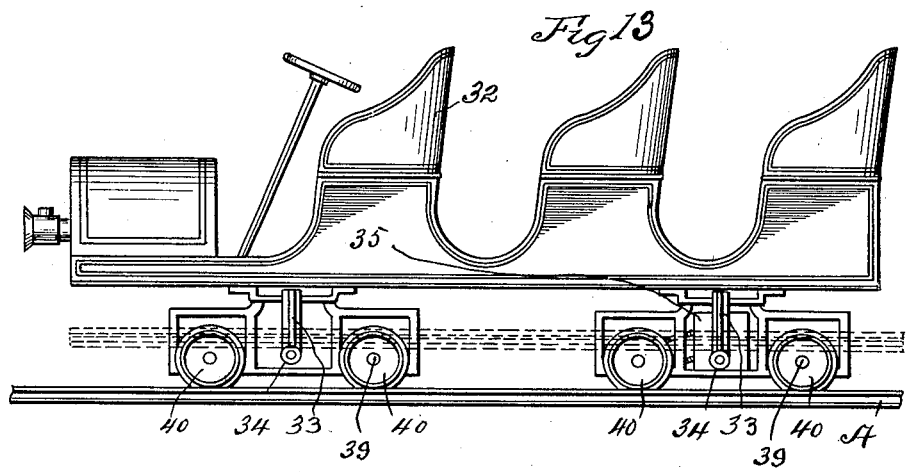
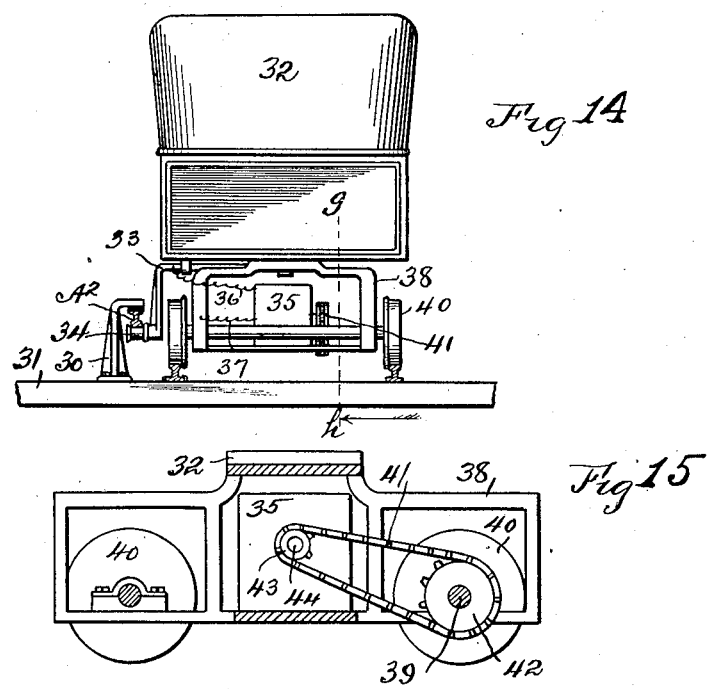

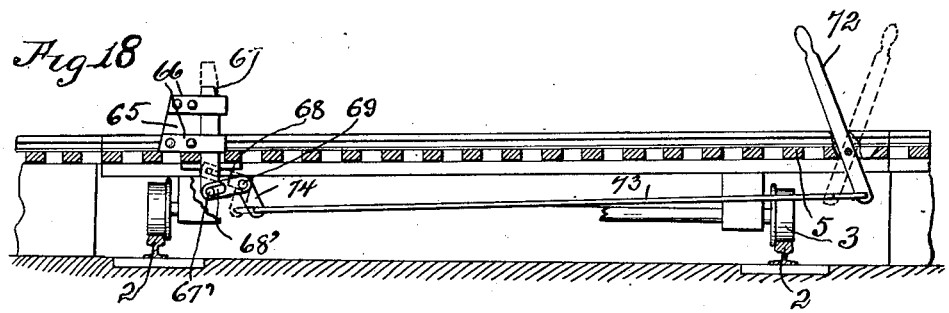
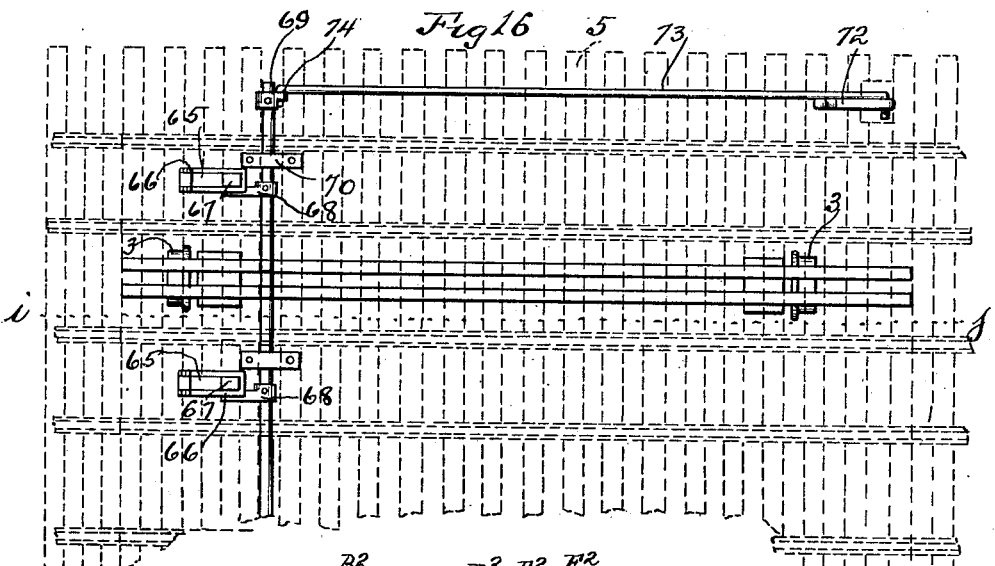
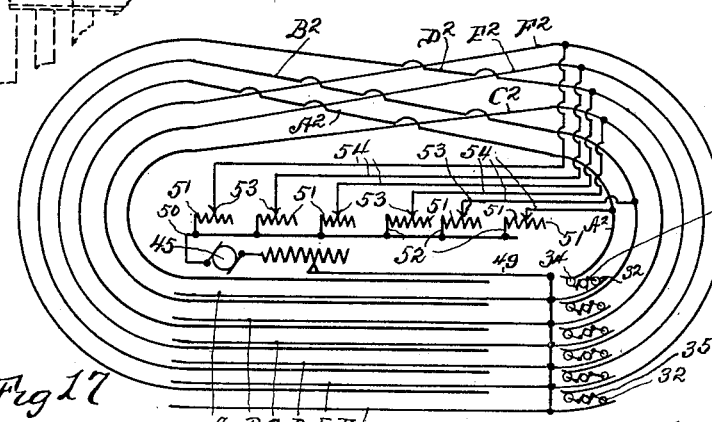

UNITED STATES PATENT OFFICE.

MARTIN LEHMAN, LLOYD BROWN, AND EDMOND W. SOHLBERG, OF KANSAS CITY, MISSOURI.

RACING AMUSEMENT APPARATUS.

No. 912,005.          Specification of Letters Patent.          Patented Feb. 9, 1909.

Application filed September 24, 1906. Serial No. 335,977.

*To all whom it may concern:*

Be it known that we, MARTIN LEHMAN, LLOYD BROWN, and EDMOND W. SOHLBERG, citizens of the United States, residing at Kansas City, in the county of Jackson and State of Missouri, have invented certain new and useful Improvements in Racing Amusement Apparatus, of which the following is a specification.

Our invention relates to improvements in racing amusement apparatus.

Our invention provides a racing course comprising a plurality of parallel tracks on which run motor vehicles, means being provided by which, when one set of vehicles are running on the tracks another set is being loaded or unloaded on track sections adapted to form portions of the tracks, other track sections being provided for completing the tracks while those carrying the cars that are being loaded or unloaded are removed from the tracks.

Our invention provides further, novel mechanism for alternately including in the tracks two sets of track sections.

Our invention provides further, novel means for releasably stopping and holding the vehicles on one set of track sections.

Other novel features are hereinafter fully described and claimed.

In the accompanying drawings which illustrate our invention—Figure 1 is a plan view of the tracks and trolley conductors. Fig. 2 is a plan view of a portion of the race tracks and the laterally movable track section supports and parts connected therewith. Fig. 3 is a side elevation view of that portion of the tracks where they cross each other. Fig. 4 is a plan view of what is shown in Fig. 3. Fig. 5 is a side elevation view of one of the track section supports and the mechanism for reciprocating the said support. Fig. 6 is a side elevation of a portion of the mechanism employed to reciprocate the two track section supports, intermediate portions of the driving shaft and clutch operating bar being removed. Fig. 7 is a plan view of what is shown in Fig. 6. Fig. 8 is a vertical section taken on the dotted line *a—b* of Fig. 7, the rope being removed. Fig. 9 is a diagrammatic view of the tracks, each track being represented by a single line. Fig. 10 is a plan view of a portion of one of the tracks and one of the track brakes. Fig. 11 is a vertical sectional view taken on the dotted line *e—f* of Fig. 10. Fig. 12 is a transverse vertical section taken on the dotted line *c—d* of Fig. 11, and showing a portion of one of the track brakes. Fig. 13 is a side elevation of one of the motor vehicles, all of which may be alike. Fig. 14 is a rear elevation of one of the motor vehicles, the track being shown in vertical cross section. Fig. 15 is a vertical section taken on the dotted line *g—h* of Fig. 14. Fig. 16 is a plan view of a portion of the car stopping mechanism carried by one of the laterally movable track section supports, the support being shown partly in solid and partly in dotted lines. Fig. 17 is a diagrammatic view of the circuits in which are located the motor vehicles. Fig. 18 is a transverse vertical sectional view taken on the dotted line *i—j* of Fig. 16, and showing a portion of the car stopping mechanism carried on one of the track section supports. Fig. 19 is a vertical cross section taken on the dotted line *k—l* of Fig. 1, showing a part of the car stopping mechanism mounted on the other track section support.

Similar characters of reference denote similar parts.

Referring to Figs. 1, 2, 3, 4 and 9, A, B, C, D, E and F denote respectively a plurality of elliptical concentrically disposed portions of the tracks forming the race course. One set of ends of the concentric portions A, B and D are connected by transverse portions A', B' and D' with opposite ends of the portions D, E and F respectively. The other ends of the portions A and B and the adjacent end of the portion C are connected respectively by transverse portions C', E' and F' with the opposite ends of the portions C, E and F respectively. The transverse portions A', B' and D' pass under the transverse portions C', E' and F', as shown in Figs. 3 and 4. By observation of Fig. 1 and Fig. 9, it will be seen that two endless tracks are thus formed comprising each a plurality of loops which cross each other, portions of the loops being concentric with each other. It will be observed that each car starting from a given place in making four rounds will finish on the same track on which it started. For instance the car starting on the track A, the inner concentric portion, will pass by way of the transverse portion A' to D, thence along D to D', thence to F, thence by F to F', thence to C, thence along C to C' and by way of C' to the portion A on which the car started. It will be noted that the cars starting on the track portions C, D and F will follow the same portions followed by A, but each in a different order from A and from each other. It will also be noted that the cars starting on the portions B and E respectively will travel each over the portions B, B', E and E' twice in going four rounds, the car on the portion B passing over B' to E, thence by E' to B and repeating, the car starting on E passing to E', thence to B, and thence back to B by B' and repeating. The portions A, B, C, D, E and F are disposed equal distances apart, the portion B being intermediate A and C, and the portion E intermediate the portions D and F. By means of this arrangement of the tracks all the cars in going four rounds will travel the same distance. G and H denote respectively two gaps extending transversely across parallel portions of the portions A, B, C, D, E and F. Transversely to the said track portions in said gaps are two horizontal tracks 1 and 2 on the rails of which are mounted the wheels 3 of two cars 4 and 5 each of which supports two sets of track sections each comprising two rails 6. The two sets of track sections are disposed on the cars 4 and 5 so that they will alternately be disposed so as to complete the portions A, B, C, D, E and F respectively when the said cars 4 and 5 are reciprocated on the tracks 1 and 2 respectively. Intermediate the tracks 1 and 2 is a platform 7 on which passengers going upon the motor vehicles may stand prior to getting on the vehicles or subsequent to getting off said vehicles.

The following described mechanism is provided for reciprocating the cars 4 and 5. Transversely under the adjacent rails of the tracks 1 and 2 and under the platform 7 is a horizontal driving shaft 8 the ends of which are rotatively mounted in bearings 9 supported on the ground. On the shaft 8 adjacent opposite ends are loosely rotative two drums 10 and 11, around which are wound respectively two ropes 12 and 13. Adjacent opposite ends of each track 1 and 2 are two vertical posts 14 having secured each to the side adjacent the adjacent car two pulley wheels 15 disposed one above and one below the rails of the tracks 1 and 2. Each rope 12 and 13 passes from its drum to opposite lower pulleys 15, thence upward to and over the upper pulleys 15 to the ends of the adjacent car to which the opposite ends of the rope are secured. Thus when one of the drums 10 or 11 is rotated in one direction, the rope mounted thereon will be operated to draw the car to which said rope is attached in one direction. By rotating the drum oppositely, the car is drawn in the other direction. To rotate the drums 10 and 11 in opposite directions, a vertical lever 16 is pivoted by a horizontal bolt 17 to a bracket 18 secured to the under side of the platform 7. A transverse clutch bar 19 is pivoted at its middle to the lower end of the lever 16, the ends of the clutch bar being bifurcated and turned downward so that the arms of the bifurcated ends are located respectively in annular peripheral grooves 20 provided respectively in two clutch members 21 secured each against rotation on the shaft 8 by a longitudinal key 22 mounted in a key way 23 provided in the shaft. The clutch members 21 are each provided with a conical outer face adapted to enter and fit a recess provided therefor in the inner end of the adjacent drum. The clutch members are preferably longitudinally movable on the shaft 8 so as to engage and disengage with the drums 10 and 11 respectively. The shaft 8 is rotated in either direction by means of a motor 24 of any desired type, the shaft 26 of which has mounted thereon a pulley 27 connected by a belt 28 with a pulley 29 mounted on the shaft 8 and rotatable with said shaft. By reversing the motor the shaft 8 may be rotated in either direction. When the lever 16 is disposed centrally, as shown in Fig. 6, both clutch members 21 are disengaged from the drums 10 and 11. By shifting laterally the lever 16 the clutch bar 19 moves the clutch members 21 endwise on the shaft 8, one of said members being thus engaged with one drum and the other member being freed from the other drum. If now the motor 24 is started to run in the proper direction, the shaft 8 will be rotated so as to wind the rope on the drum which is engaged by one of the members 21 and draw the car attached to such rope to the position desired with reference to the track portions A, B, C, D, E and F.

Now follows a description of the circuits over which travel the currents which propel the motor vehicles. $A^2$, $B^2$, $C^2$, $D^2$, $E^2$ and $F^2$ denote a plurality of electric conductors or "third" rails supported on the horizontal arms of right angled brackets 30 the lower ends of the vertical portions of which are secured to the cross ties 31 on which are secured the rails of the tracks. The conductors are mounted upon the under sides of and insulated from the horizontal arms of the brackets 30. Said conductors are disposed respectively parallel with the courses taken by the motor vehicles on their first rounds of the tracks, beginning and ending at opposite sides of the gaps G and H in the tracks. For example conductor $A^2$ first follows track portion A, thence, along track portion A' to track portion D and thence along D to a point adjacent the gap G, as shown in Fig. 17 and Fig. 1. The third rail conductors are placed respectively along the inner sides of the tracks which they follow, so that they serve to prevent the motor vehicles from tipping by centrifugal force. 32 denotes one of a plurality of motor vehicles, each of which has secured to its under side the horizontal portion of a right angled bracket 33 on the vertical arm of which is rotatively mounted a trolley wheel 34 adapted to bear against the under side of the third rail conductor along which it runs. Each motor vehicle carries on it a motor 35 of any suitable type and connected in series by conductors 36 and 37 respectively with the trolley bracket 33 and the frame work 38 of the vehicle 32. The framework 38 has mounted therein the vehicle axle 39 having secured to it the car wheels 40 which place the axle in circuit with the track rails on which the wheels run. Any suitable means may be employed to drive the vehicle 32 from the motor 35. In the drawings is shown one construction in which a sprocket chain belt 41 is mounted on two sprocket wheels 42 and 43 respectively mounted on the axle 39 and the armature shaft 44 of the motor 35.

Referring to Fig. 17 45 denotes an electric generator such as a dynamo to one brush of which is connected a conductor 46, the said conductor being connected to one terminal of the coil 47 of a rheostat. 48 denotes a movable contact adapted to successively connect with the different turns of the coil 47 when moved lengthwise of said coil. To the contact 48 is connected a conductor 49 which is connected to the track portions A, B, C, D, E and F. To the other brush of the dynamo 45 is connected a conductor 50. 51 denotes a plurality of coils forming portions of a plurality of rheostats. 52 denotes a plurality of conductors connected at one set of ends to the conductor 50, the other set of ends being connected one each to one end of a coil 51. 53 denotes a plurality of movable contacts forming parts of the rheostats respectively and movable so as to successively connect with the turns respectively of the adjacent coils 51. 54 denotes a plurality of conductors connected at one set of ends respectively with the contacts 53 and at the other set of ends with the conductors $A^2$, $B^2$, $C^2$, $D^2$, $E^2$ and $F^2$ respectively. The coils 51 and contacts 53 form varying resistance devices by which the currents supplied to the various motors 35 may be varied so as to independently vary the speed of the vehicles driven by said motors. Any suitable means may be employed for automatically moving the contacts 53 relative to their coils 51 respectively. Adjacent the gap G is provided a plurality of track brakes for slackening the speed of the motor vehicles when it is desired to have them stop at the end of a race.

Referring to Figs. 1, and 2 and 10 to 12 inclusive, 55 denotes a plurality of normally horizontal planks disposed lengthwise between the rails of the track portions A, B, C, D, E and F respectively adjacent the gap G. Said planks are secured each at one end to a tie 31. Pivoted in suitably supported bearings 56 under the planks 55 respectively are a plurality of pairs of levers 57, the upper ends of the levers of each pair being adapted to bear against and raise the adjacent plank 55 at its free end to a height in which the plank will strike the bottom of a motor vehicle passing along the track over the plank, and thus slacken the speed of said vehicle. A plurality of horizontal bars 58 disposed lengthwise of the tracks are pivoted respectively to the lower ends of the levers 57. Transversely under the rails of the tracks A, B, C, D, E and F in bearings 59 is mounted a horizontal rock shaft 60, the outer end of which has secured to it a crank 61 by which the shaft is rocked. On the shaft 60 are secured a plurality of crank arms 62 provided each with a radial slot 63 in which is mounted a horizontal pin 64 provided one in each bar 58. By swinging the crank 61 the levers 57 are swung so as to raise and lower the free ends of the brake planks 55. The track sections 6 on each car or track section support 4 and 5 are inclined to the right as viewed in Fig. 1, thus enabling the motor vehicles on the said track sections to run therefrom onto the tracks to the right of the gaps G and H. To stop the motor vehicles on the track sections 6 of each car or support 4 and 5 the following described mechanism is employed. On each support 4 and 5, adjacent the outlet ends of the track sections and one intermediate the two rails of each track section, are secured a plurality of blocks 65 each having secured thereto horizontal U shaped guide plates 66. In each set of guide plates 66 is mounted a vertically slidable bar 67 in the lower end of which is secured a horizontal pin 67' which is mounted in a slot 68' provided in the adjacent one of a plurality of crank arms 68 rigidly secured on a horizontal rock shaft 69 disposed transversely to the track sections 6 in suitable bearings 70 secured to the under side of each car 4 and 5. On the car 4 located in the gap G, as shown in Fig. 19, a lever 71 has its lower end secured to the adjacent rock shaft 69. By swinging the lever 71 the bars 67 are vertically moved on the support 4. On the car or track support 5, the lever 72 is pivoted to the support 5 and has connected pivotally to its lower end a rod 73 disposed parallel with the track sections 6 and pivoted at its other end to a crank arm 74 rigidly secured to the shaft 69 pivoted in bearings 70 on the car or track support 5. By swinging the lever 72 the bars 67 on the car 5 may be vertically moved in and out of the positions in which they will engage the forward ends of the motor vehicles.

In operating the invention, two sets of motor vehicles may be employed if desired, one set being unloaded and loaded while the other set is racing on the tracks. Thus while a set of vehicles is on the track sections 6 having the stop bars 67 on the car 5, the other set of vehicles may be on the car 4, the cars being in the positions shown in Fig. 1. The lever 71 is then swung releasing the vehicles on the car 4, which vehicles will then run across the inner track sections of the car 5 and onto the tracks at the right of the gap H, as viewed in Fig. 1. After the vehicles have made four rounds, the crank 61 is swung so as to swing upward the brake planks 55 so as to slacken the speed of the vehicles. The lever 71 is then swung so as to move the adjacent bars on the support 4 into position to stop the vehicles on the track section support or car 4. The lever 16 is then swung so as to engage the drum 10 with the adjacent member 21, the motor 24 being driven in a direction such that the shaft 8 will rotate the drum 10 to wind the rope 12 in a direction such that the car will be run to the other end of the track 1. The lever 16 is then reversed, as is the motor 24, on doing which, the car 5 will be drawn to the other end of track 2, and the track sections on said car will be disposed so that the set of vehicles thereon will, on swinging the lever 72, be freed from the adjacent bars 67 and will run from said car on to the tracks to the right thereof. The cars will be stopped as hereinbefore described, excepting that in this instance the lever 72 will be swung so as to raise the bars 67 on car 5, thus stopping the vehicles on car 5 on the track sections on which they started, if four rounds have been run. The operations just described may be repeated as desired.

Having thus described our invention, what we claim and desire to secure by Letters Patent, is:—

1. The combination with an endless track comprising a plurality of crossed loops disposed for a part parallel with each other, and provided with a transverse gap in the parallel portions of said loops, of a support transversely movable in said gap and carrying two sets of track sections, said sets adapted when the support is reciprocated to alternately complete respectively said loops.

2. The combination with a plurality of parallel tracks having a gap extending therethrough, and having each a plurality of crossed loops disposed for a part parallel with each other of a support reciprocative in said gap and carrying two sets of track sections adapted when the support is reciprocated to alternately complete said tracks respectively across said gap, means for reciprocating said support, and means for stopping and releasably holding cars running on one set of said track sections.

3. The combination with a track having a gap, of a support transversely movable in said gap and carrying longitudinally inclined track sections adapted to alternately complete the track across the gap when the support is reciprocated, and means for stopping and releasably holding a car on one of said track sections.

4. The combination with a track having a gap, of a support transversely movable in said gap and carrying two longitudinally inclined track sections adapted when the support is reciprocated to alternately complete the track across the gap, means for reciprocating said support, and means for stopping and releasably holding a car on one of said inclined track sections.

5. The combination with a track comprising a plurality of concentric portions and transverse crossed portions connecting the ends of the inner with the opposite ends of the outer portions, the concentric portions having a transverse gap extending through said sections, of a support transversely movable in said gap and carrying two sets of track sections adapted when the support is reciprocated to alternately complete the concentric portions across said gap.

6. The combination with a track comprising a plurality of concentric portions, and transverse portions crossing each other and connecting the ends of the inner with opposite ends of the outer portions, the concentric portions having extending therethrough a transverse gap, of a support transversely movable in said gap and carrying two sets of track sections adapted when the support is reciprocated to alternately complete the concentric portions across said gap, and means for reciprocating said support.

7. The combination with a track comprising a plurality of concentric portions, and transverse portions crossing each other and connecting the ends of the inner with opposite ends of the outer portions, the concentric portions having a gap extending transversely therethrough, of a support reciprocative in said gap and carrying two sets of track sections adapted when the support is reciprocated to alternately complete the concentric portions across said gap, means for reciprocating said support, and means for stopping and holding cars on one set of said track sections.

8. The combination with a car track having a transverse gap, of a support in said gap carrying two track sections adapted when the support is reciprocated to alternately complete the track across the gap, means for reciprocating said support, a car on said track, means for propelling the car along said track at different rates of speed, and means for stopping and releasably holding the car when it is on one of said sections.

9. The combination with a plurality of parallel track portions having therein two transverse gaps, of two supports reciprocative in said gaps respectively and carrying each two sets of track sections adapted to alternately complete the said track portions across the gap in which is disposed the support carrying said sections when said support is reciprocated, means for reciprocating said supports, means provided on each of said supports for stopping and holding releasably cars disposed on one set of track sections on said support, a plurality of cars on said track portions, and means for propelling said vehicles along said track portions respectively.

10. The combination with a plurality of tracks disposed for a part parallel with each other, and having a transverse gap through the parallel portions, said tracks forming a part of an electrical circuit, conductors disposed along said tracks and included in said circuit, a generator in said circuit, a plurality of motor vehicles on said tracks and having motors included in said circuit and each carrying means for connecting the motors with the tracks and conductors respectively, a support movable in said gap and carrying two sets of track sections adapted when the support is reciprocated to alternately complete said tracks respectively across said gap, and means for reciprocating said support.

11. The combination with a plurality of tracks disposed for a part parallel with each other and having through said parallel portions a transverse gap, the tracks forming a portion of an electrical circuit, of conductors disposed parallel with said tracks and included in said circuit, vehicles on said tracks and carrying motors, means for connecting said motors with said tracks and conductors respectively, a generator in said circuit, a transversely movable support in said gap and carrying two sets of track sections adapted when the support is reciprocated to alternately complete the tracks across said gap, said track sections being inclined, releasable means on said support for stopping and holding the cars when on one set of track sections, and means for reciprocating said support.

In testimony whereof we affix our signatures in presence of two witnesses.

MARTIN LEHMAN.
LLOYD BROWN.
EDMOND W. SOHLBERG.

Witnesses:
E. B. House,
Will R. Winch.